US006963858B2

(12) United States Patent
Wang et al.

(10) Patent No.: US 6,963,858 B2
(45) Date of Patent: Nov. 8, 2005

(54) METHOD AND APPARATUS FOR ASSIGNING CONSEQUENTIAL RIGHTS TO DOCUMENTS AND DOCUMENTS HAVING SUCH RIGHTS

(75) Inventors: Xin Wang, Torrance, CA (US); Eddie J. Chen, Rancho Palos Verdes, CA (US); Thomas DeMartini, Culver City, CA (US); Charles P. Gilliam, Darien, CT (US); Guillermo Lao, Torrance, CA (US); Aram Nahidipour, Laguna Niguel, CA (US); Michael Raley, Downey, CA (US); Thanh Ta, Huntington Beach, CA (US); Bijan Tadayon, Germantown, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

(21) Appl. No.: 10/316,187

(22) Filed: Dec. 11, 2002

(65) Prior Publication Data

US 2003/0135466 A1    Jul. 17, 2003

Related U.S. Application Data

(63) Continuation-in-part of application No. 09/867,749, filed on May 31, 2001.

(51) Int. Cl.⁷ ............................................. G06F 17/60
(52) U.S. Cl. .............................. 705/51; 707/9; 707/104
(58) Field of Search ............................. 705/50–59, 18, 705/20–23, 26–27; 707/8–10, 100–104; 380/201–203, 380/229–233; 713/155–177; 434/322, 350, 434/118, 365

(56) References Cited

U.S. PATENT DOCUMENTS

| 5,629,980 | A |   | 5/1997  | Stefik et al.            |
|-----------|---|---|---------|--------------------------|
| 5,638,443 | A | * | 6/1997  | Stefik et al. ... 705/54  |
| 5,920,861 | A | * | 7/1999  | Hall et al. ...... 707/9  |
| 6,135,646 | A |   | 10/2000 | Kahn et al.              |
| 6,138,119 | A |   | 10/2000 | Hall et al.              |
| 6,141,754 | A |   | 10/2000 | Choy                     |
| 6,282,404 | B1| * | 8/2001  | Linton ............ 434/350|
| 6,408,336 | B1| * | 6/2002  | Schneider et al. ... 709/229 |
| 6,599,324 | B2| * | 7/2003  | Saito et al. ...... 715/513 |

FOREIGN PATENT DOCUMENTS

JP         2000030171 A  *  1/2000   .......... G08B 25/04

OTHER PUBLICATIONS

"Enigma Announces INSIGHT 4.1 Electronic Publish Software; Only Solution that Dynamically Modifies, Adds and Deletes CD-ROM and Customer-based Intranet Content", Business Wire, Aug. 27, 1998.*
International Search Report for PCT/US02/14447 dated Feb. 14, 2003 (1 page).

* cited by examiner

Primary Examiner—James P. Trammell
Assistant Examiner—Mary Cheung
(74) Attorney, Agent, or Firm—Marc S. Kaufman; Nixon Peabody, LLP

(57) ABSTRACT

A rights management system including one or more consequential rights associated with digital content, and specifying a manner of use of the digital content, a right management module that enforces the rights permitting use of the digital content in accordance with the rights upon occurrence of a consequential event. The consequential event is based on another usage right. In one embodiment, the consequential event is the exercise, expiration, or possession of another usage right.

32 Claims, 6 Drawing Sheets

METHOD AND APPARATUS FOR ASSIGNING CONSEQUENTIAL RIGHTS TO DOCUMENTS AND DOCUMENTS HAVING SUCH RIGHTS

RELATED APPLICATION DATA

This application is a Continuation-in-part of U.S. patent application Ser. No. 09/867,749 filed May 31, 2001.

BACKGROUND OF THE INVENTION

1. Field of the Invention

This invention relates to controlling use of content, or other items, through usage rights associated with the content. In particular, this invention relates to the association of consequential rights with items, and the enforcement of such rights.

2. Description of Related Art

Digital rights management (DRM), or "rights management", refers with a process of associating usage rights to digital content, as well as managing and enforcing the usage rights. Content can include any type of content, such as music, books, multimedia presentations, video information, executable programs or the like. In general, any information that is capable of being stored can be protected through the use of rights management. For example, a digital book could be accompanied by a license establishing usage rights such as viewing, printing, borrowing, or the like, and any conditions governing the digital book's usage. These rights could then be controlled by, for example, an associated reader's software, and the allowable transactions, such as buying, printing, or the like, be authorized by, for example, a clearinghouse. One of the most important issues impeding the widespread distribution of digital content via electronic means, such as the Internet, is the lack of protection of intellectual property rights of content owners during the distribution, dissemination and use of the digital content. Rights management addresses this problem.

In the world of printed documents, a work created by an author is typically provided to a publisher, which formats and prints numerous copies of the work. The copies are then distributed to bookstores or other retail outlets, from which the copies are purchased by end users. While the low quality of physical copying, and the high cost of distributing printed material have served as deterrents to unauthorized copying of most printed documents, digital documents allow easy copying, modification, and redistribution if they are unprotected. Accordingly, rights management controls the use of content, for example, to permit copying, modifying and redistributing under certain specified condition.

U.S. Pat. No. 5,530,235, No. 5,634,012, No. 5,715,403, No. 5,638,443 and No. 5,629,980, the disclosures of which are incorporated herein by reference in their entirety, generally disclose systems for rights management. In general, an author creates a document and forwards it to a distributor for distribution. Typically, the author is the creator of the content, however, the author can be any one of the creator, the owner, the editor, or any other entity controlling a portion of content, or an agent of one of those entities. The author may distribute electronic documents directly, without involving a secondary party such as a distributor. Therefore, the author and the distributor may be the same entity. A distributor can distribute electronic documents to one or more users, upon request. In a typical electronic distribution model, the content can be distributed as an electronic document in encrypted form. For example, a distributor can encrypt the content with a random key, having encrypted the random key with a public key corresponding to one or more users. Thus, the encrypted document can be customized solely for a particular user. The user is then able to use the private key to unencrypt the public key and use the public key to unencrypt and view the electronic document.

Payment for the electronic document can be passed from a user to a distributor by way of a clearinghouse which can collect requests from one or more users who wish to view a particular document. The clearinghouse can also collect payment information, such as debit transactions, credit transactions, credit card transactions, or other known electronic payment schemes and forward the collected payments to a distributor. Furthermore, the clearinghouse may retain a share of the payment as a fee for these services. The distributor may also retain a portion of the payment from the clearinghouse to cover, for example, distribution services and royalties due an author. Various business models can be addressed with rights management systems.

SUMMARY OF THE INVENTION

Applicant has extended the concept of rights management to include control of use of any type of item, such as goods and services, in addition to content. In this manner, Applicant has developed the concept of an "enforceable usage right" as described in U.S. patent application Ser. No. 10/159,272 filed on Jun. 3, 2002 and entitled "Method and Apparatus for Distributing Enforceable Property Rights", the disclosure of which is incorporated herein by reference.

It is known to use rights labels and the like for expressing usage rights using a rights expression language, for example. The rights labels can be used to create a license by adding a resource (such as content) specification and a principal (authorized user) specification). In the above referenced application, Applicant discloses the concept of and "item ticket" associated with the license and specifying an item, such as a good or service. The item ticket can be considered as content and thus access and use of the ticket can be controlled in a known manner in accordance with the associated usage rights. The item ticket can be in the form of a renderable document to create a human readable coupon or the like. Alternatively, the item ticket can be a computer readable code or other symbol or specification that permits access to the item specified in the item ticket. Any type of usage rights can be associated with digital content or any other item (through use of item ticket, for example) to control use of the items in accordance with the usage rights.

Consequential rights associated with items allow for the limited usage of the item based on, for example, an absolute value, a relative value, or the like. For example, the starting period of a right based on another event or another right can trigger the availability of a usage right associated with content. Furthermore, the time for limiting use of the content can be expressed as an absolute value, such as a particular time and date, or a relative value, such as a usage right expiring two minutes after a first usage. The usage right can also be linked to other events, such as the exercise of another usage right such as accessing of another document, or the like. For example, usage rights can permit a piece of music to be listened to for only one minute, or only once, after the right to a second piece of music has expired or been exercised. Moreover, the usage right can be linked to the possession of another usage right. For example, the usage right to print a document may be exercised only upon establishing the possession of a right to view the same document.

This consequential right assignment can be hierarchical, such as the systems and methods described in co-pending patent application Ser. No. 09/867,748 filed May 31, 2001 entitled "Method and Apparatus for Hierarchical Assignment of Rights to Documents and Documents Having Such Rights," the disclosure of which is incorporated herein by reference in its entirety. Hierarchal rights are usage rights that one user can transfer to another user. Hierarchial rights can be configured in a tree structure. In general, the closer the user right's are to the original rights in the tree, the greater the users rights The conditional or consequential rights assignment can also be linked to other events that may or may not have more than one step or condition. For example, the condition could be a chain of events that trigger the conditional or consequential rights. An example of this can be used in remote learning schemes. For example, if college courses are offered on the Internet, the courses can be offered at a specified time, or the access to a second course restricted until a first course has been viewed.

In another example, if an exam has five sections, and for each section, a thirty-minute period is allocated, the user can proceed to the next section only by using the thirty allocated minutes, or by pushing a button on, for example, a user interface, which indicates that they have completed that section. Alternatively, other triggering events and/or conditions can also govern transition to a subsequent usage right based on, for example, a fifteen-minute break allocated between sections three and four. In this exemplary embodiment, multiple timers or counters can keep track of the time for each section and/or for all of the sections combined.

Alternatively, the test taker could switch back and fourth between different sections, as long as the time is within the allocated time for each section or within other thresholds, such as a fifty-minute maximum for any given section. Alternatively, in another exemplary embodiment, alternating between sections may be forbidden. In this exemplary embodiment, time allocations can be based on multiple rules, and counters may or may not be dependent on each other, as a test administrator sets the rules and constraints of the exam prior to administration of the exam.

In yet another alternative, the user may be allowed to exercise a consequential usage right associated with content only upon exercising another usage right. In other words, exercise of a usage right may be conditioned upon exercise of another usage right. For example, the user may be allowed to access content only upon exercising another usage right, such as accessing another item of content. For example, if an exam has five sections, the user can be allowed to proceed to the next section only after viewing and/or completing another section of the examination. In another example, a user can edit content only after a copy of the content is made. Alternatively, viewing of content may be required prior to printing that content or other content.

As another example, for joint projects, more than one person may contribute to the document with comments and modifications and/or design changes in which case, a rights management system can keep track of exercised rights, modifications, sources of modifications, dates, order of changes, approvals, vetoes, priorities, or the like. For example, in a paperless office, three approvals from three different departments may be needed for an action item. Alternatively, a first person, such as a subordinate, may only be permitted to view or edit a document after a second person, such as a supervisor of the first person, has made changes, approved, or otherwise exercised a usage right.

Rights assignment can also be integrated into, for example, an e-mail or electronic messaging system. For example, a content owner can assign different rights to different individuals and share or limit rights to information or files based on those rights. A friend could request permission to view or use a particular file, or further distribute the file to another individual, everyone in the address book or the public as a whole. Alternatively, the rights could, for example, limit the extent to which a user can add or delete individuals from a mailing list or address book. The right to view people in an address book could also be restricted based on a usage right. As another example, while in an instant messaging mode, a user can have the right to exclude or limit other users to particular document.

If the set of assigned rights are commonly used for different documents, the rules can be expressed, for example, as templates, multi-hyphen purpose templates, or the like. Templates are discussed in U.S. application Ser. No. 10/046,695 entitled "Method and Apparatus for Managing Digital Content Usage Right" filed Jan. 17, 2002, and U.S. application Ser. No. 10/159,272 entitled "Method and Apparatus For Distributing Enforceable Property Rights" filed Jun. 3, 2002, that are incorporated herein by reference in its entirety. In general, a template can be used whenever a user desires to assign a predetermined set of rights to one or more, such as a set, of additional users. This template can contain, for example, a set of usage rights that may be particularly tailored towards the user class, accounting instructions, or the like.

In another exemplary embodiment, a content owner may desire to assign some rights to a user, in terms of what compression methods the user can employ on the original data. For example, for some data, the content owner may wish to let the user be able to compress the data only by one of the choices of lossless compression techniques to maintain the integrity of the data. Alternatively, in another situation, for specific data the content owner may desire to let the user compress the data only by one of the choices of lossy methods, as long as the bit rate or total size of the document stays below a threshold.

For multilevel databases, some parts of the data may be open to the public, while other parts may require different levels of rights or security clearance, such as differentiated security, using attribute-level sensitivity. For example, in a company, the telephone number of the employees may be accessible to the other employees, while other personal information, such as personnel information, cannot be accessed unless the content user is within a predefined class. For example, the direct supervisor may have access to inspect, read or modify the employee's personnel file, as long as a "paper trail" which records information pertaining to the supervisor's changes is generated and associated with the file. Furthermore, the right to notarize particular document, such as the electronic-signature of an authorized entity and/or a time stamp, with the option of an encryption for safe storage, can also be granted separately by a content owner.

Aspects of the present invention relate to associating consequential rights with content. In particular, the present invention relates to consequential rights which require exercise, expiration, or possession of one or more then usage rights as a condition for exercising the consequential rights.

This and other features and advantages of this invention are described in, or are apparent, from the following detailed description of the embodiments.

DETAILED DESCRIPTION OF THE INVENTION

Typically, usage rights are associated with one or more items of digital content based on, for example, a license agreement with the content owner. These usage rights associated with content are generally provided with one or more conditions under which the usage rights may be exercised. The usage rights may include one or more usage rights and/or delegation rights. The usage rights specify the manner of use a particular user has to the content such as viewing, editing, modifying, updating, printing, executing, or the like. The delegation rights include, for example, to how many users a user can distribute the content to, and which rights the user is allowed to associate with the distributed contents.

Figure 1:
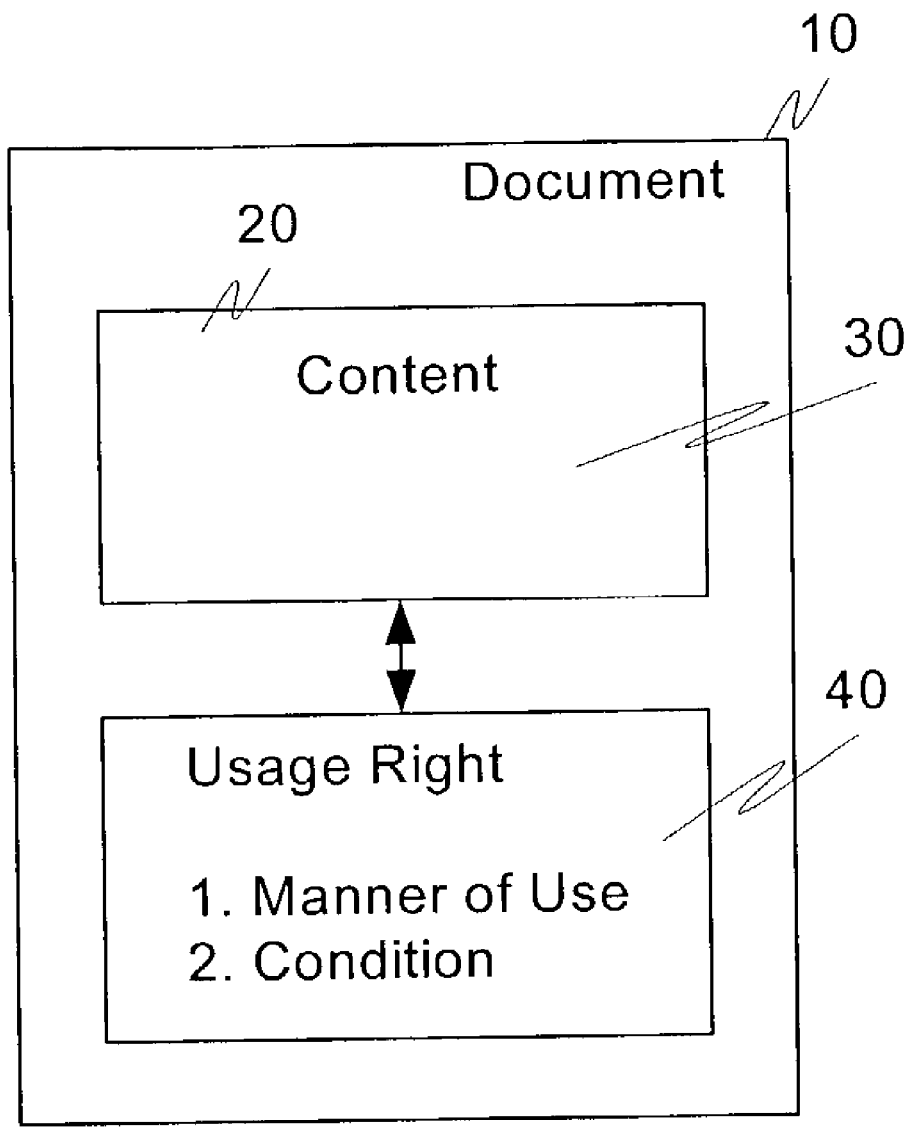
FIG. 1 is a schematic illustration of a document in accordance with one embodiment of the present invention.

FIG. 1 shows a digital document 10 sometimes referred to as a "digital work", which includes content 30 and usage right 40 that is associated with the content 30. The usage right 40 sets forth the manner in which the content 30 may be used by an authorized user. The usage right 40 also sets forth one or more conditions under which the usage right 40 may be exercised. As described in detail below, the usage right 40 may be consequential right.

Conditional rights are usage rights that allow the digital document to be used by the user upon occurrence of a specific event or satisfaction of a particular condition that is set forth in the usage right. This occurrence may be indicated by a conditional trigger, i.e., a conditional event, which indicates the occurrence of the event or satisfaction of the condition required. Similarly, consequential rights are usage rights that allow the digital document to be used by the user upon occurrence of a consequential trigger, i.e., a consequential event. The consequential trigger is based on another usage right. For example, the consequential trigger maybe the exercise, expiration, or possession of another usage right. Hence, "consequential triggers", respectively, refers to the fact that the condition of the usage right is based on another usage right such as the exercise, expiration, or possession of another usage right. By providing a consequential right that may be exercised upon occurrence of a consequential trigger, a content owner can provide additional specificity and flexibility governing the use of the content.

Figure 2:
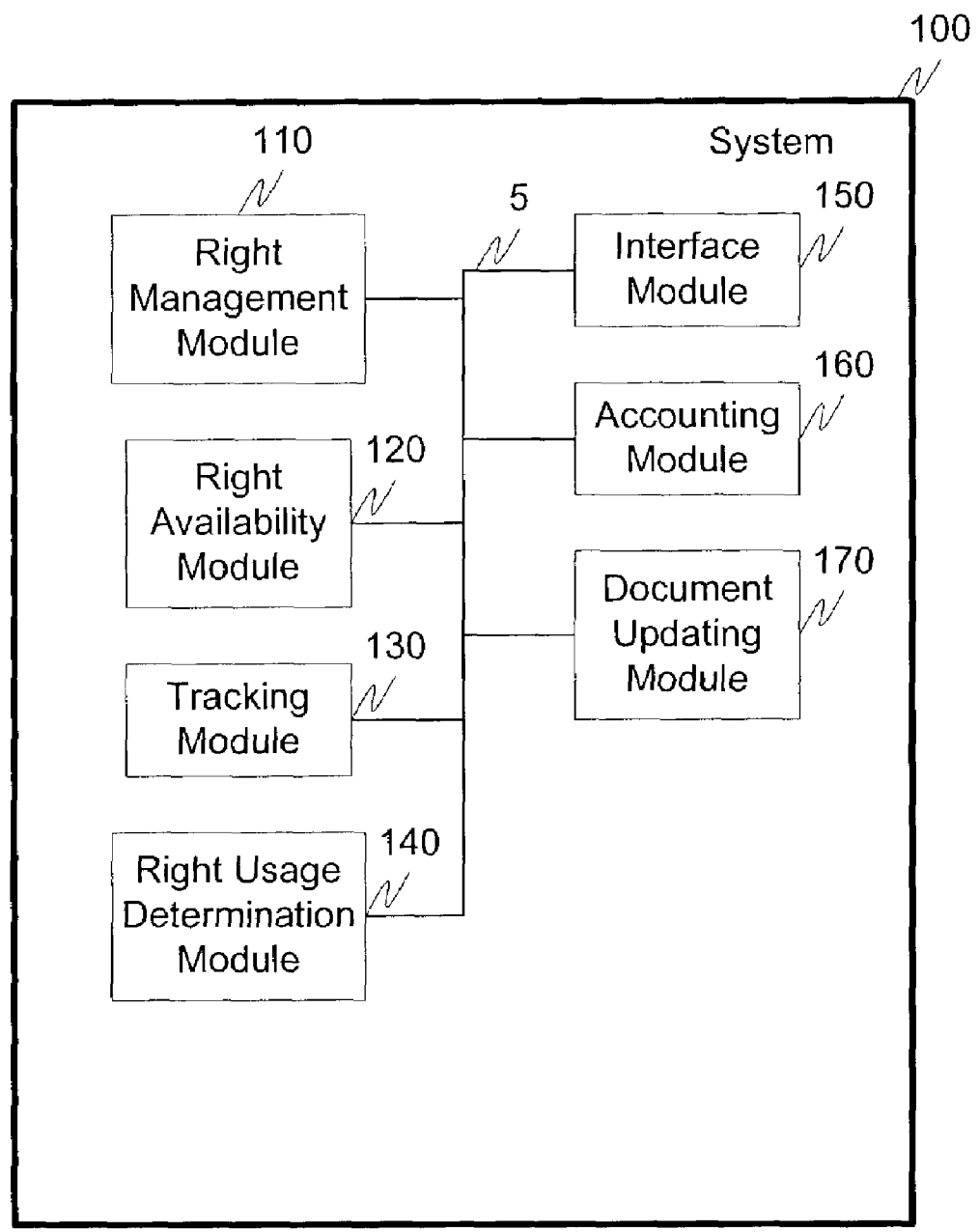
FIG. 2 is a functional block diagram illustrating an exemplary rights management system according to one embodiment of the present invention.

FIG. 2 illustrates an exemplary rights management system 100 in accordance with one embodiment of the present invention. The system 100 comprises a rights management module 110, a rights availability module 120, a tracking module 130, a rights usage determination module 140, an interface module 150, an accounting module 160, and a document updating module 170, interconnected by link 5. The system 100 can also be connected to a distributed network (not shown) which may, or may not, also be connected to one or more other systems, account processing systems, rights management systems, or other distributed networks, as well as one or more input devices and display devices (not shown).

While the embodiment illustrated in FIG. 2 shows the system 100 and associated components collocated, it is to be appreciated that the various components of the system 100 can be located at distant portions of a distributed network, such as a local area network, a wide area network, an intranet and/or the Internet, or within a dedicated system or document system. Thus, it should be appreciated that the components of the system 100 can be combined into one device or collocated on a particular note of distributed network. Furthermore, it should be appreciated that for ease of illustration, the various functional components of the system 100 have been divided as illustrated in FIG. 2. However, any of the functional components illustrated in FIG. 2 can be combined or further partitioned without affecting the operation of the system. As will be appreciated from the following description, and for reasons of computation efficiency, the components of the system can be arranged at any location within a distributed network without effecting the operation of the system. Furthermore, it is to be appreciated that the term module as used herein includes any hardware and/or software that provide the functionality as discussed herein. Likewise, the system 100 can comprise any necessary controllers, memory, and/or I/O interfaces that may be necessary given the particular embodiment and/or implementation of the DRM system 100. Furthermore, the links 5 can be a wired or wireless link or any other known or later developed elements that are capable of supplying and communicating data to and from the connected elements.

Functionally, referring to FIGS. 1 and 2, a request by a user to access or otherwise use digital document 10 is received via the interface module 150. Upon receiving the request from the user, the rights availability module 120 of the DRM system 100, in cooperation with the rights management module 110 and the interface module 150, monitors for the occurrence of the consequential triggers associated with the digital document 10. Depending on the conditions set forth, including the occurrence of the consequential trigger(s), the digital content 30 is released to the user for the requested use in accordance with the specified manner of use. Any necessary accounting, such as crediting and/or debiting may be performed by the accounting module 160.

In one embodiment, whether the usage right 40 has been exercised by the user is determined by the rights usage determination module 140. Furthermore, depending on the actual right granted to the user by the usage right 40, the digital document 10 may be updated by the document updating module 170. This allows the digital document 10 to reflect, for example, which usage rights were used, the effect of any of these usage rights, a signature of the user and, for example, any modifications to, or assignment of, delegation rights (if any). Moreover, such updating of the digital document 10 may be tracked by the tracking module 130. Then, if the consequential right has an associated termination or expiration portion, the rights availability module 120 in cooperation with the right management module 110 and the interface module 150, terminates the user's usage and/or delegation rights.

Figure 3:
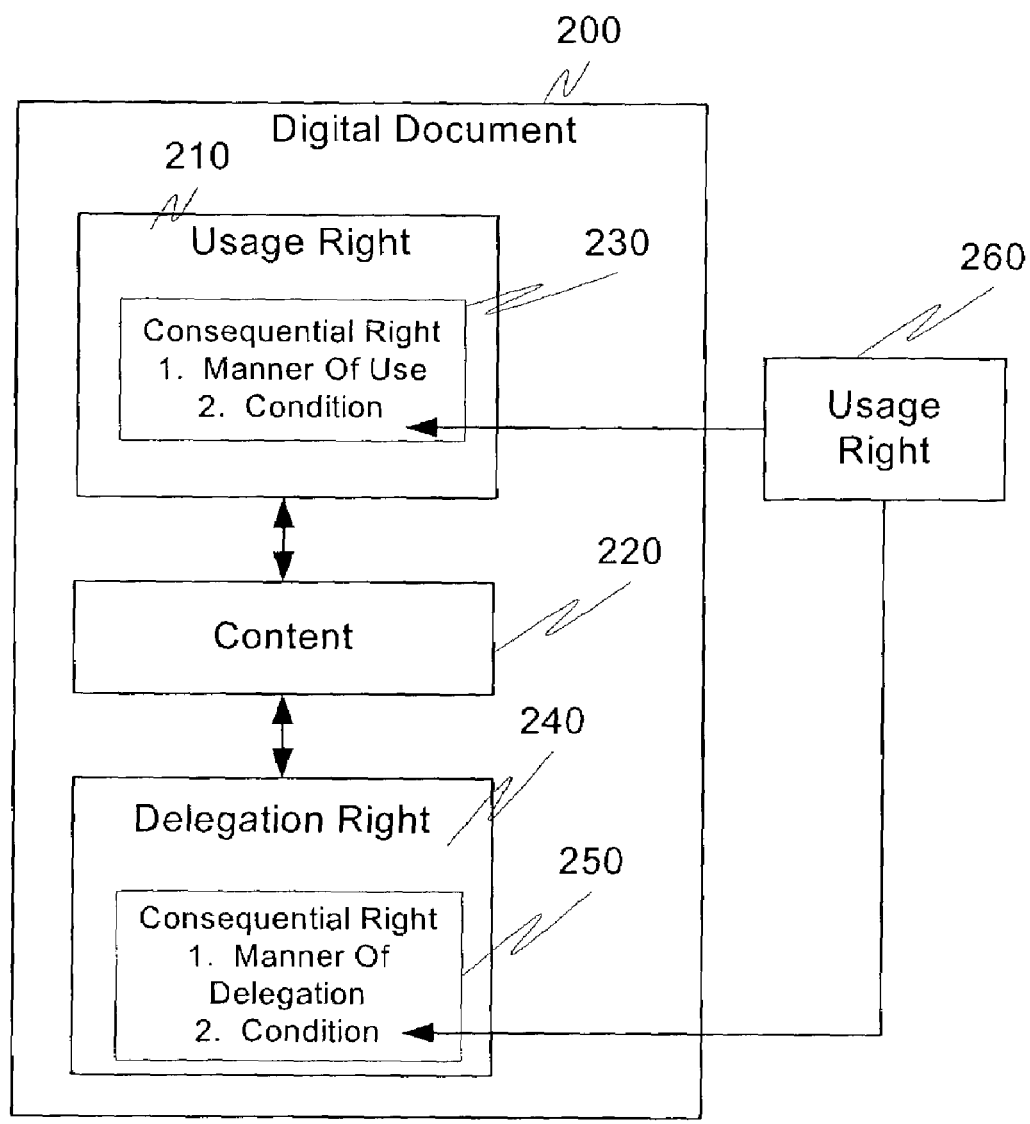
FIG. 3 is a schematic illustration of a document in accordance with another embodiment of the present invention.

FIG. 3 illustrates an exemplary digital document 200 in accordance with another embodiment of the present invention. The digital document comprises usage right 210 and delegation right 240. The usage right 210 and the delegation right 240 are associated with content 220. Depending on the application of the present invention, the content 220 may be books, documents, audio information, music, multimedia presentations, video information, executable programs, or the like. As also shown, the usage right 210 includes a consequential right 230 that sets forth a manner of use and conditions. Depending on the application of the present invention, the manner of use may include viewing, printing, editing, approving, modifying, updating, rendering, executing, distribution, copying, etc.

The condition for the consequential right 230 is based on another usage right 260. The consequential event or trigger that indicates the satisfaction of the condition of the consequential right 230 may be exercise of another usage right 260 associated with content 220 or other content. In another embodiment, the consequential event may be the expiration of usage right 260. In still another embodiment, the consequential trigger may even be the mere possession of usage right 260. For example, a license may set forth that in order for a user to print the content, the user must have the right to view the content which may be confirmed by looking for a grant to view the document. It should be understood that "possession" of a usage right (and variations thereof) as used herein does not necessarily mean that the user actually physically possesses the usage right or components thereof on the user's computer or the like. Instead, possession refers to the fact that the user is the principal of the usage right, i.e. the user to whom the usage right is granted, or otherwise is entitled to exercise the usage right. Of course, actual physical possession of the usage right or components thereof, for example, such as a key, is also "possession" of the usage right as used herein. Therefore, the term possession and variations thereof should be understood more broadly than mere physical possession.

Moreover, the consequential trigger may also be based on a plurality of events associated with the usage right 260. In such embodiments, the consequential trigger may be determined to have occurred upon occurrence of any, or all, of the plurality of events. In still another embodiment, the consequential trigger may be determined to have occurred upon sequential occurrence of these plurality of events.

In a similar manner, the delegation right 240 includes a consequential right 250 that sets forth the manner of delegation and conditions, the condition being based on usage right 260 or another usage right. The delegation right 240 may include, for example, to how many users a user can distribute the digital content, and which rights the user is allowed to associate with the distributed content.

It should be noted that whereas in the illustrated example, the usage right 260 that serves as the condition for the consequential rights 230 and 250 is shown to be separate from the digital document 200, the usage right 260 may also be part of the digital document 200 in other embodiments so that certain usage rights to the document 200 are restricted based on the exercise, expiration or possession of another usage right of the same content 220. For example, the DRM system 100 may be implemented so that the user's exercise of a right to view the content 220 allows the consequential right 230 to be exercised, which in turn, allows the user to print the content 220. Alternatively, the DRM system 100 may be implemented so that the user's exercise of a right to view the content 220 allows delegation of consequential right 250 to another user.

In the example previously described, when implemented in examination and testing administration applications, the present invention allows the administrator of the examination to require the test taker to exercise certain usage rights associated with the test. For instance, the present invention may be used to require the test taker to complete, or otherwise indicate as being completed, one section of the examination before allowing the test taker to proceed to take another section of the examination. Of course, the present invention may be used in any appropriate manner to control exercise and delegation of usage rights, and the above discussion merely describe example applications.

Thus, in the example of FIGS. 2 and 3 described above, the usage right 230 and the delegation right 240 include consequential rights associated with content 220. The exercise of the consequential rights is allowed upon detection of a consequential trigger, the consequential trigger being based on another usage right 260, for example, the exercise, expiration, or possession of usage right 260. In this regard, the rights management module 110 of the DRM system, may be implemented to allow use of the content 220 in accordance with the consequential rights based on another usage right 260.

Figure 4:
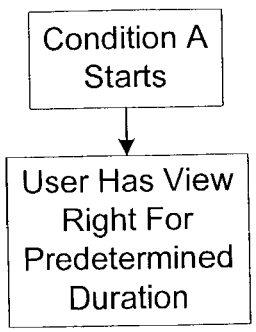
FIG. 4 illustrates an exemplary right assignment according to one embodiment of the present invention.
Figure 5:
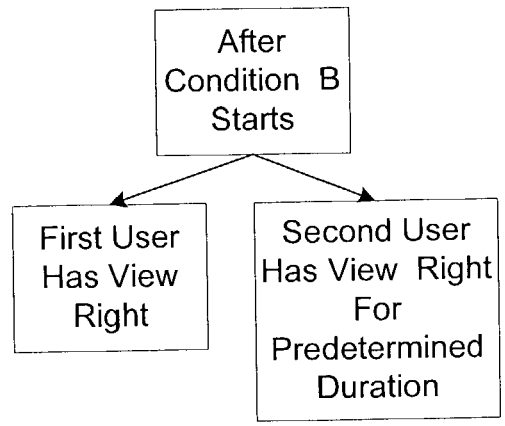
FIG. 5 illustrates an exemplary right assignment according to another embodiment of the present invention.
Figure 6:
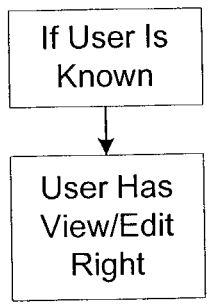
FIG. 6 illustrates an exemplary right assignment according to still another embodiment of the present invention.

FIGS. 4–9 illustrate examples of right assignment in accordance with various embodiments of the present invention. The conditions shown in these figures may include consequential trigger so that subsequent consequential rights may be exercised by the users. In particular, FIG. 4 illustrates that after condition A commences, a user has a view right for a predetermined duration. Again, it should be noted that the condition A may be an occurrence of a consequential trigger such as the exercise, expiration, or possession of another usage right or rights. In FIG. 5, after a condition B starts, a first user has a view right associated with digital content. Additionally, a second user has a view right which is limited to a predetermined duration. Again, the condition B may be the first user's exercise of another usage right, for instance, the first user exercising his/her right to view the document.

Figure 7:
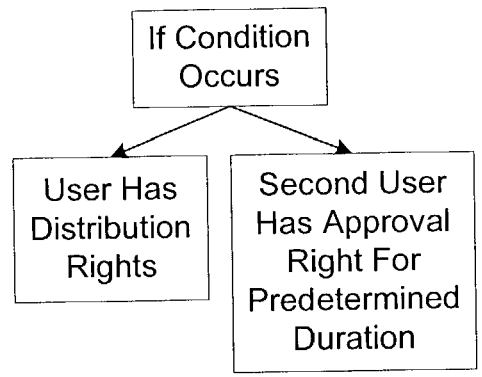
FIG. 7 illustrates an exemplary right assignment according to yet another embodiment of the present invention.

The conditional trigger may be provide in any appropriate manner to indicate satisfaction of the underlying condition. For instance, in FIG. 6, if an exemplary user in possession of the document is known, via, for example, a smart card, an identification, such as driver's license, a fingerprint, or the like, and the user's identity matches the conditional right, the user may have the view and edit rights for the digital document. In FIG. 7, if a predetermined condition occurs, a first user has distribution rights, and a second user has an approval right for a predetermined duration. For example, the conditional event could be a stock offering that the first user can distribute. The second user can then be granted the option to purchase stock at, for example, a preferred price, for a 24 hour time period. After 24 hour time period, this right to purchase can be withdrawn, and the second user's access to the document be restricted.

Figure 8:
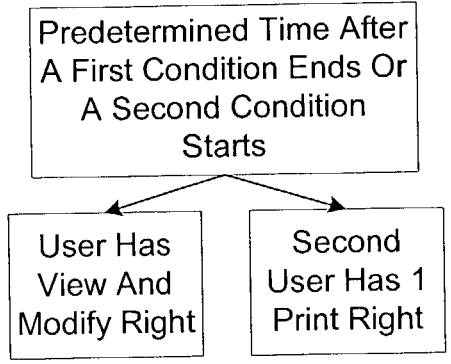
FIG. 8 illustrates an exemplary right assignment according to still another embodiment of the present invention.
Figure 9:
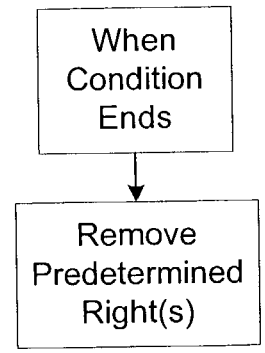
FIG. 9 illustrates an exemplary right assignment according to yet another embodiment of the present invention.

FIG. 8 illustrates an example where the trigger is provided predetermined time after a first condition ends or a second condition starts. Upon occurrence of the trigger, subsequent rights are available. In this exemplary embodiment, after the occurrence of the trigger, a first user has view and modify rights, while a second user is granted one print right. In FIG. 9, the conditional trigger is provided when a predetermined condition ends. Upon satisfaction of this triggering event, rights are removed from the document possessed by the user. For example, the document can monitor the current date and time, and once that time has passed, restrict access to the document.

Figure 10:
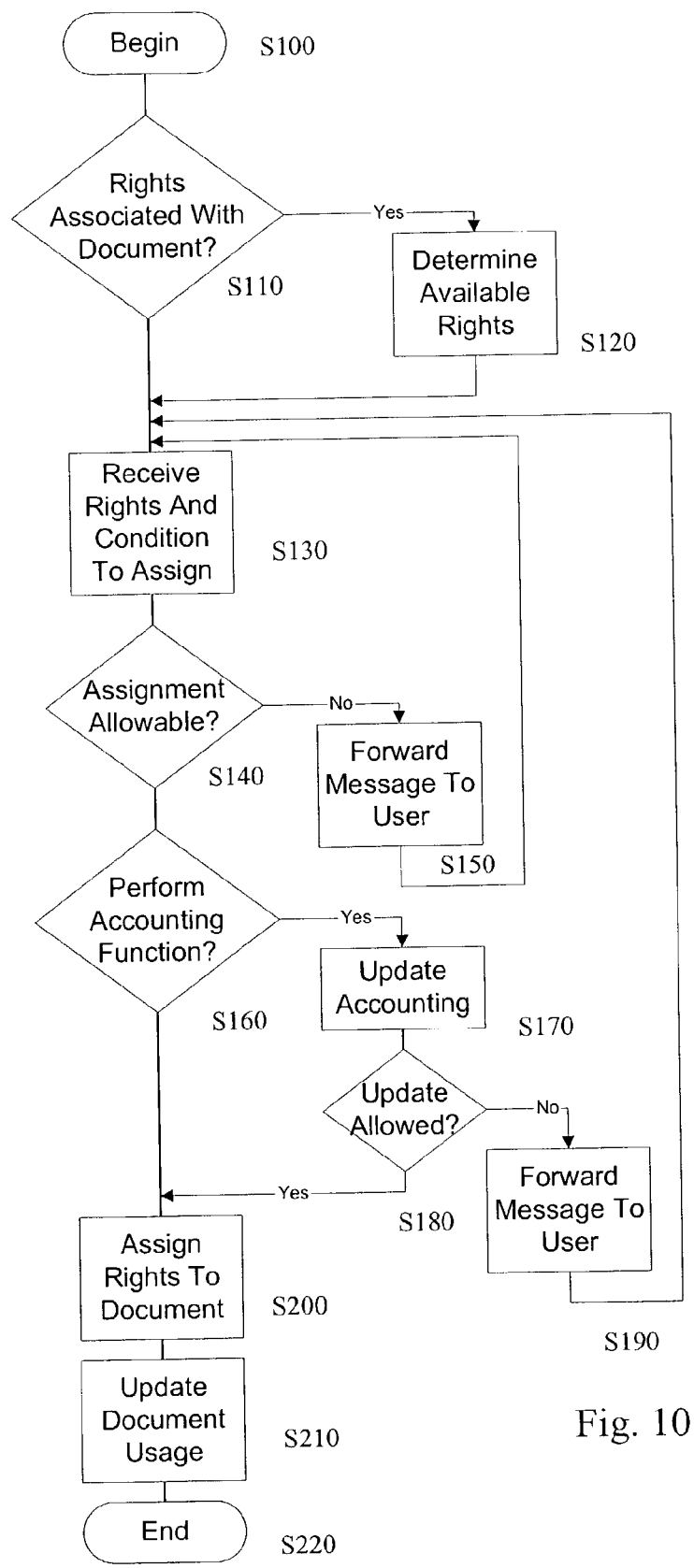
FIG. 10 is a flowchart of a method for assigning rights according to an embodiment of the present invention.

FIG. 10 illustrates an exemplary embodiment of a method for associating consequential rights with content to define a digital document such as those shown in FIGS. 1 and 3. In particular, control begins in step S100 and continues to step S110. In step S110, a determination is made whether usage rights are already associated with the content. If usage rights are associated with the content, control continues to step S120 where the available rights are determined, for example, the usage and delegation rights available to the particular requesting user. Control then continues to step S130.

In step S130, the rights and conditions a user desires to have associated with the content are received. Next, in step S140, it is determined whether the assignment of these rights is allowable based on, for example, a license agreement with the content owner. If the assignment is allowable, control continues to step S160. Otherwise, if the rights assignment is not allowable, control jumps to step S150. In step S150, a message can be forwarded to the user indicating the assignment is not available. Control then optionally continues back to step S130.

In step S160, it is determined if an optional accounting function is to be performed. If accounting is not necessary control jumps to step S200. If accounting is necessary, control continues to step S170 where any necessary accounting functions are attempted. Then, in step S180, a determination is made whether the accounting such as any crediting and/or debiting is allowed based on, for example, a license agreement with the content owner. If accounting is not allowed, control continues to step S190 where a message can be forwarded to the user and control returns back to step S130. If the accounting functions are successful, control continues to step S200.

In step S200, the usage right as chosen by the user is associated with the content. Then, in step S210, the digital document is updated reflecting, for example, which usage rights were used, the effect of any of these usage rights, a signature of the user and, for example, any modifications to or assignment of delegation rights. Control then continues to step S200 where the control sequence ends.

Figure 11:
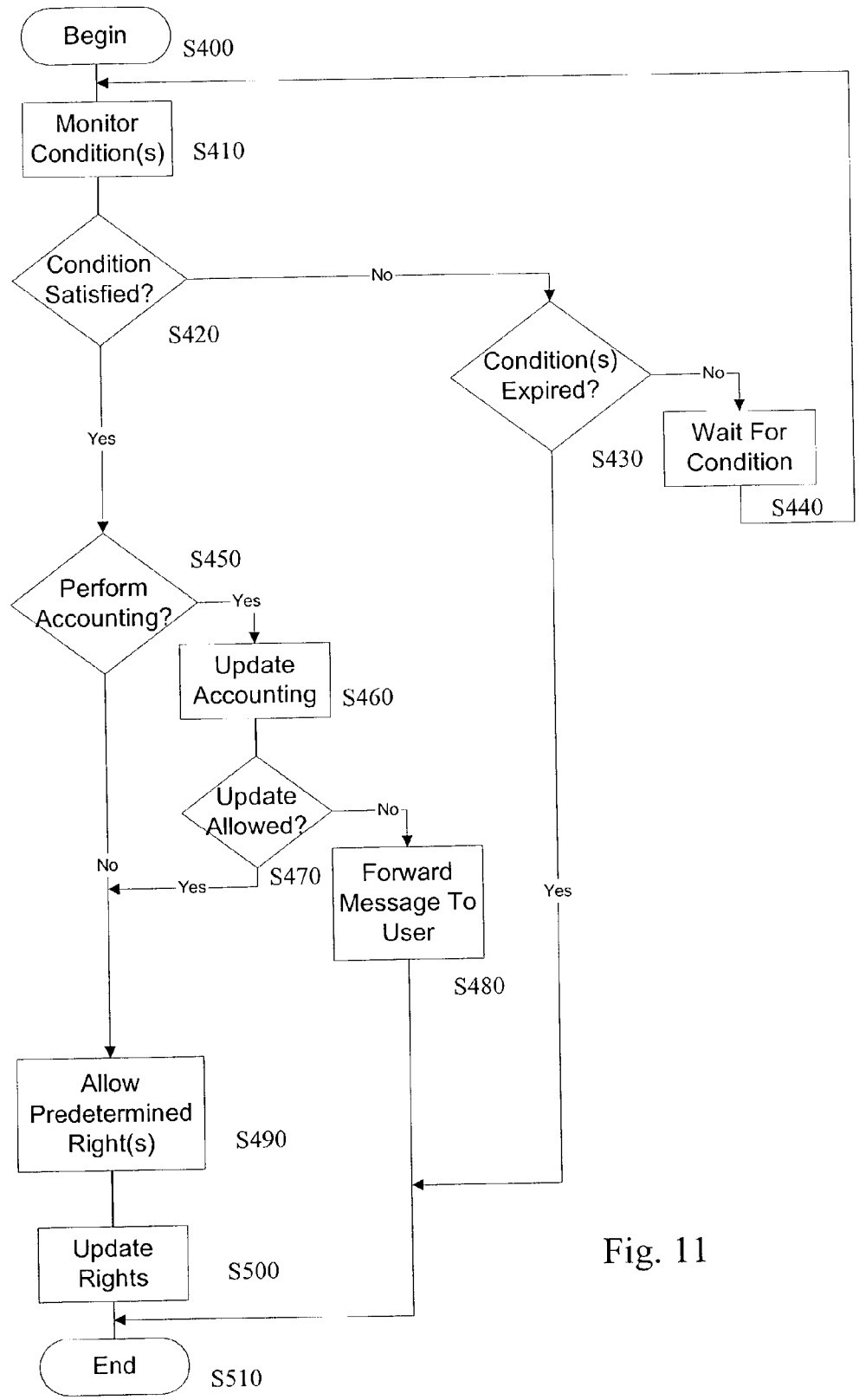
FIG. 11 is a flowchart of a method for exercising a right based on a condition according to one embodiment of the present invention.

FIG. 11 illustrates an exemplary method of enforcing conditions of a usage right which could grant or restrict access to the content of the digital document. In particular, control begins in step S400 and continues to step S410. In step S410, one or more conditions are monitored for detection of a triggering event. Again, it should be understood that the triggering event which satisfies the one or more conditions may be the exercise, expiration, or possession of another usage right. Then, in step S420, a determination is made whether the condition of the usage right has been satisfied. If the condition is satisfied, i.e. the triggering event is detected, control continues to step S450. Otherwise, control continues to step S430. Once again, the condition can be the exercise of a usage right, expiration of a usage right, or the possession of a usage right.

In the case that condition is not satisfied in step S420, a determination is made in step S430 as to whether the condition has already expired. For instance, a condition may have a time associated there with so that the condition must be satisfied by a predetermined time or duration of time. Referring again to the test administration example, the condition may have an expiration time such as 1:00 p.m. by which part one of the examination must be completed to proceed to part two of the examination. Alternatively, the condition may have an expiration duration such as one hour during which part one (i.e., first content) of the examination must be completed before being allowed to proceed to part two (i.e., second content) of the examination. If the condition is not met within these parameters, the condition can be considered to be expired in step S430. If the condition is determined to have expired in step S430, control jumps to step S510 where the method of enforcing conditions of a usage right ends. Thus, in the test administration example, the testing is terminated. Otherwise, control continues to step S440, where the system waits for the condition to be satisfied, i.e. the triggering event to occur, and returns to step S410.

If the condition is satisfied in step S420, a determination is made whether any accounting actions are necessary in step S450. Such accounting actions may include verification of payment of required fees or the like. If accounting actions are required, control continues to steps S460 during which any necessary accounting, such as debiting and/or crediting is performed. This may be attained by, for example, the accounting module 160 of the DRM system of FIG. 2 previously described. Otherwise, if accounting actions are not required, control proceeds to step S490. Next, in step S470, a determination is made whether the debiting and/or crediting of step S460 was successful. If the accounting was successful, control proceeds to step S490. Otherwise, if the accounting action was not successful, control continues to step S480, where a message can be forwarded to the user indicating a problem associated with the accounting. Control then continues to step S510.

In step S490, one or more users are allowed to access the digital document based on the usage rights associated with the digital document. Next, in step S500, the usage rights of the digital document can be updated, for example, by associating a digital signature with the identity of the user and/or any modifications the user may have made to the document, and any delegations by that user. This may be attained by the document updating module 170 of the system 100 previously described relative to FIG. 2. Again, such updating of the digital document may be tracked by the tracking module 130. Control then continues to step S510 where the control sequence ends.

As illustrated in FIG. 2, the system of the present invention can be implemented either on a single programmed general purpose computer or plural programmed general purpose computers or other devices. However, the system 100 can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device capable of implementing a finite state machine that is in turn capable of implementing the flowcharts in FIGS. 10–11 can be used to implement the DRM system 100 that manages conditional and/or consequential rights according the preferred embodiment of the present invention. Various devices, such as PDA's, cell phones, set top boxes and the like can be used.

Furthermore, the disclosed method may be readily implemented in software using object or object-oriented software development environments that provide portable source code that can be used on a variety of computer or workstation hardware platforms. Alternatively, the disclosed document and right management system may be implemented partially or fully in hardware using standard logic circuits or VLSI design. Whether hardware or software is used to implement the systems and methods in accordance with this invention is dependent on the speed and/or efficiency requirements of the system, the particular function, and a particular software and/or hardware systems or microprocessor or microcomputer systems being utilized. The document and rights management systems illustrated herein, however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor or the like. In these instances, the methods and systems of this invention can be implemented as a program embedded in a personal computer, an E-Book, a secure container, or the like, such as a Java® or CGI script, as an XML document, as a resource residing on a server or graphics workstation, as a routine embedded in a dedicated electronic document, an electronic document viewer, or the like. The document and rights management system can also be implemented by physically incorporating the systems and methods into a hardware and/or software system, such as the hardware and software systems of a computer or dedicated electronic document.

The preferred embodiment discloses content as the item controlled through usage rights. However, any type of item can be controlled in accordance with the invention.

It is, therefore, apparent that there has been provided, in accordance with the present invention, systems and methods for managing electronic documents. While this invention has been described in conjunction with a number of embodiments, it is evident that many alternatives, modifications and variations would be or are apparent to those of ordinary skill in the applicable art. Accordingly, applicants intend to embrace all such alternatives, modifications and variations that are within the spirit and scope of this invention as defined by the appended claims.

What is claimed is:

1. A rights management system for managing and enforcing rights to digital works comprising:
   at least one repository for enforcing rights associated with digital content;
   a usage right associated with a first digital content, said usage right specifying manner of use of the first digital content;
   a consequential right associated with a second digital content, said consequential right specifying a manner of use of the second digital content and a consequential event such that the consequential right is exercisable only after occurrence of the consequential event; and
   a rights management module that enforces the consequential rights by permitting use of the second digital content in accordance with the specified manner of use only upon occurrence of the consequential event;
   wherein said consequential event is at least one of exercise and expiration of the usage right to thereby provide sequential access to said first digital content and said second digital content.

2. The system of claim 1, wherein the manner of use includes at least one of, editing, approving, modifying, executing, updating and copying.

3. The system of claim 1, wherein the manner of use is manner of rendering the first or second digital content.

4. The system of claim 1, wherein the first or second digital content comprises at least one of, books, audio information, music, multimedia presentations, executable code, and video information.

5. The system of claim 1, wherein said consequential event is the exercise of the usage right.

6. The system of claim 1, wherein said consequential event is the expiration of the usage right.

7. The system of claim 1, wherein said consequential event is based on a plurality of events, at least one of said plurality of events being at least one of exercise and expiration of the usage right.

8. The system of claim 7, wherein said consequential event is determined to have occurred upon occurrence of all of said plurality of events.

9. The system of claim 7, wherein said consequential event is determined to have occurred upon occurrence of any of said plurality of events.

10. The system of claim 7, wherein said consequential event is determined to have occurred upon sequential occurrence of said plurality of events.

11. The system of claim 1, wherein said first or second digital content comprises an educational course.

12. The system of claim 1, wherein said first or second digital content comprises an examination.

13. A method of managing and enforcing rights to use digital works in a system having at least one repository for enforcing rights associated with content of the digital works, the method comprising the steps of:
   electronically determining a usage right associated with a first digital content, said usage right specifying manner of use of the first digital content;
   electronically determining a consequential right associated with a second digital content, said consequential right specifying a manner of use of the second digital content and a consequential event, and being exercisable only upon occurrence of said consequential event; and
   enforcing said consequential right to permit use of said second digital content in accordance with the manner of use specified only upon occurrence of the consequential event;
   wherein said consequential event is at least one of exercise and expiration of the usage right to thereby provide sequential access to said first digital content and said second digital content.

14. The method of claim 13, wherein the manner of use includes at least one of viewing, printing, editing, approving, modifying, updating and copying.

15. The method of claim 13, wherein the manner of use is a manner of rendering the first or second digital content.

16. The method of claim 13, wherein the first or second digital content comprises at least one of books, audio information, music, multimedia presentations, executable code, and video information.

17. The method of claim 13, wherein said consequential event is the exercise of the usage right.

18. The method of claim 13, wherein said consequential event is the expiration of the usage right.

19. The method of claim 13, wherein said consequential event is based on a plurality of events.

20. The method of claim 19, wherein said consequential event is determined to have occurred upon occurrence of all of said plurality of events.

21. The method of claim 19, wherein said consequential event is determined to have occurred upon occurrence of any of said plurality of events.

22. The method of claim 19, wherein said consequential event is determined to have occurred upon sequential occurrence of said plurality of events.

23. A computer readable media, including one or more computer-readable instructions, for managing and enforcing rights to digital works in a system having at least one repository for enforcing rights associated with content of the digital works, the computer-readable instructions configured to cause one or more computer processors to perform the steps of:
   determining a usage right that specifies a manner of use of a first digital content; and
   determining a consequential right associated with a second digital content, said consequential right specifying manner of use of the second digital content and consequential event that must occur to exercise said consequential right;
   wherein the consequential event is at least one of exercise and expiration of the usage right to thereby provide sequential access to said first digital content and said second digital content.

24. The computer readable media of claim 23, wherein the manner of use includes at least one of editing, approving, modifying, updating and copying.

25. The computer readable media of claim 23, wherein the manner of use is a manner of rendering.

26. The computer readable media of claim 23, wherein the digital works comprise at least one of books, music, audio information, multimedia presentations, executable code and video information.

27. The computer readable media of claim 23, wherein said consequential event is the exercise of the usage right.

28. The computer readable media of claim 23, wherein said consequential event is the expiration of the usage right.

29. The computer readable media of claim 23, wherein said consequential event is based on a plurality of events.

30. The computer readable media of claim 29, wherein said consequential event is determined to have occurred upon occurrence of all of said plurality of events.

31. The computer readable media of claim 29, wherein said consequential event is determined to have occurred upon occurrence of any of said plurality of events.

32. The computer readable media of claim 29, wherein said consequential event is determined to have occurred upon sequential occurrence of said plurality of events.

* * * * *